United States Patent [19]
Moser

[11] Patent Number: 5,871,412
[45] Date of Patent: Feb. 16, 1999

[54] TECHNICAL FIELD

[75] Inventor: George Moser, Wixom, Mich.

[73] Assignee: Behr America, Inc., Walled Lake, Mich.

[21] Appl. No.: 794,846

[22] Filed: Feb. 4, 1997

[51] Int. Cl.⁶ .................................. F16H 9/00; F16H 7/00
[52] U.S. Cl. ................................................. 474/76; 474/84
[58] Field of Search .................................. 474/69–71, 73, 474/75, 76, 84–88, 101–110, 111

[56] References Cited

U.S. PATENT DOCUMENTS

| | | |
|---|---|---|
| 112,103 | 2/1871 | Wilcock et al. . |
| 255,618 | 3/1882 | Hager . |
| 1,283,309 | 10/1918 | Roby . |
| 1,347,842 | 7/1920 | De Voe . |
| 1,985,766 | 12/1934 | Dahms et al. . |
| 2,487,949 | 11/1949 | Shekels . |
| 2,549,247 | 4/1951 | Scott . |
| 2,623,397 | 12/1952 | Battersby . |
| 2,688,216 | 9/1954 | Lorig et al. . |
| 3,062,065 | 11/1962 | Shaw .......................................... 474/75 |
| 3,396,988 | 8/1968 | Kroening . |
| 3,813,956 | 6/1974 | Whitecar ................................... 474/88 |
| 3,837,291 | 9/1974 | Umlor ....................................... 474/88 |
| 4,010,700 | 3/1977 | Webb ........................................ 474/71 |
| 4,028,964 | 6/1977 | Jones ........................................ 474/88 |
| 4,278,159 | 7/1981 | Roth et al. . |
| 4,362,524 | 12/1982 | Lob et al. ................................. 474/88 |
| 4,661,086 | 4/1987 | Railsback . |
| 4,728,315 | 3/1988 | Schlagmüller . |
| 4,813,917 | 3/1989 | Borden . |
| 4,922,727 | 5/1990 | Viegas . |
| 4,993,993 | 2/1991 | Gill ........................................... 474/11 |
| 5,041,067 | 8/1991 | Hauser . |
| 5,112,281 | 5/1992 | Minato et al. . |
| 5,334,105 | 8/1994 | Wang . |
| 5,524,725 | 6/1996 | Schantzen ............................... 474/111 |
| 5,730,672 | 3/1998 | Lin ........................................... 474/88 |

FOREIGN PATENT DOCUMENTS

| | | | |
|---|---|---|---|
| 0113482 | 3/1945 | European Pat. Off. ................. | 474/76 |

*Primary Examiner*—Charles A. Marmor
*Assistant Examiner*—Matthew A. Kaness
*Attorney, Agent, or Firm*—Howard & Howard

[57] ABSTRACT

An automotive cooling assembly including a radiator and a cooling fan for forcing air over the radiator. A multiple speed fan drive interconnects the cooling fan to an engine of a vehicle. The multiple speed fan drive includes a fan shaft for supporting the cooling fan and a drive shaft running parallel to the fan shaft. A number of pulleys having associated belts couple the fan shaft to the drive shaft. An engagement device allows the fan shaft to remain stationary while the drive shaft is rotating. The engagement device also selectively engages one of the belts and their respective associated pulleys into driving relationship for rotating the fan shaft in response to rotation of the drive shaft. The rotational speed of the cooling fan can be faster, slower or in sync with the rotational speed of the engine. The cooling fan can also remain stationary while the drive shaft of the engine is still rotating. Hence, the cooling fan effectively forces air over the radiator of the engine when necessary, irrespective of the rotational speed of the engine.

16 Claims, 4 Drawing Sheets

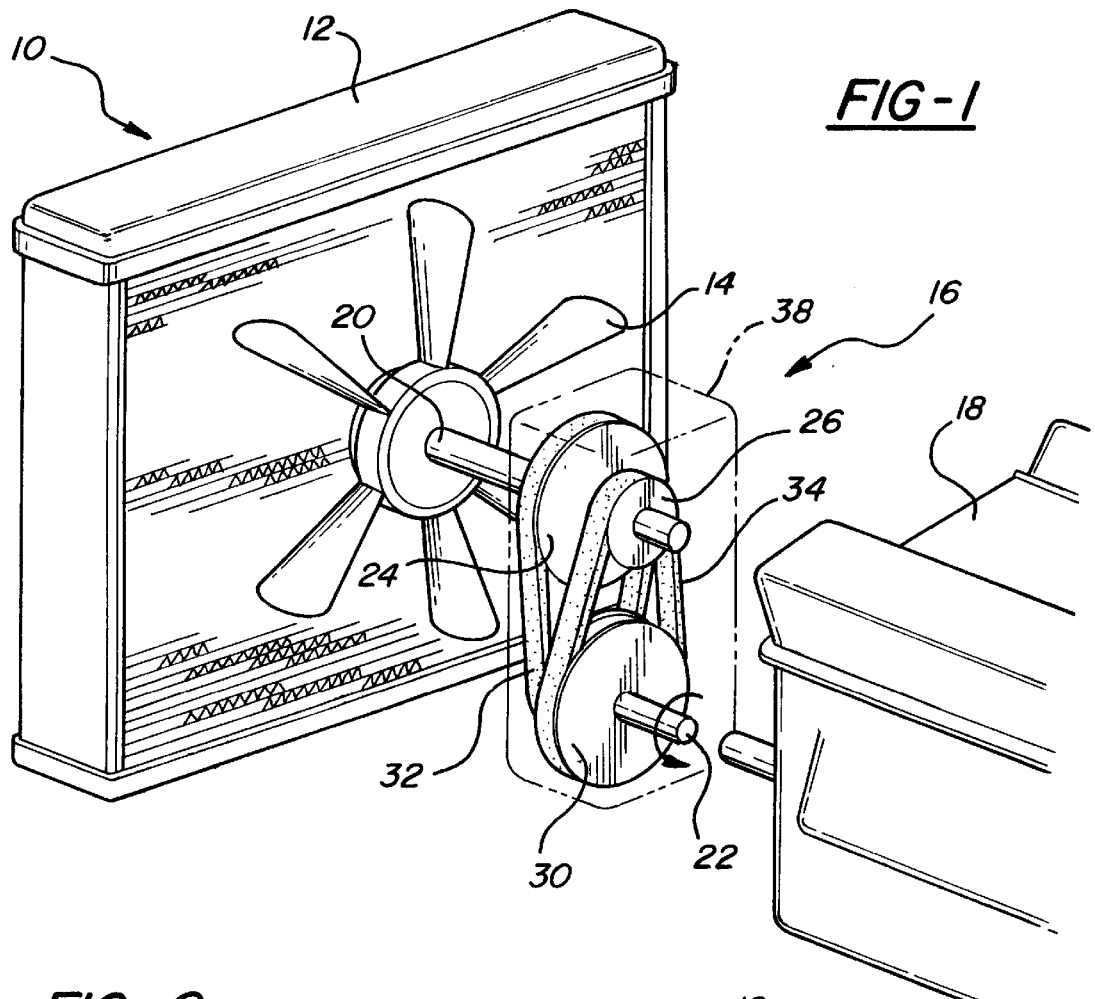
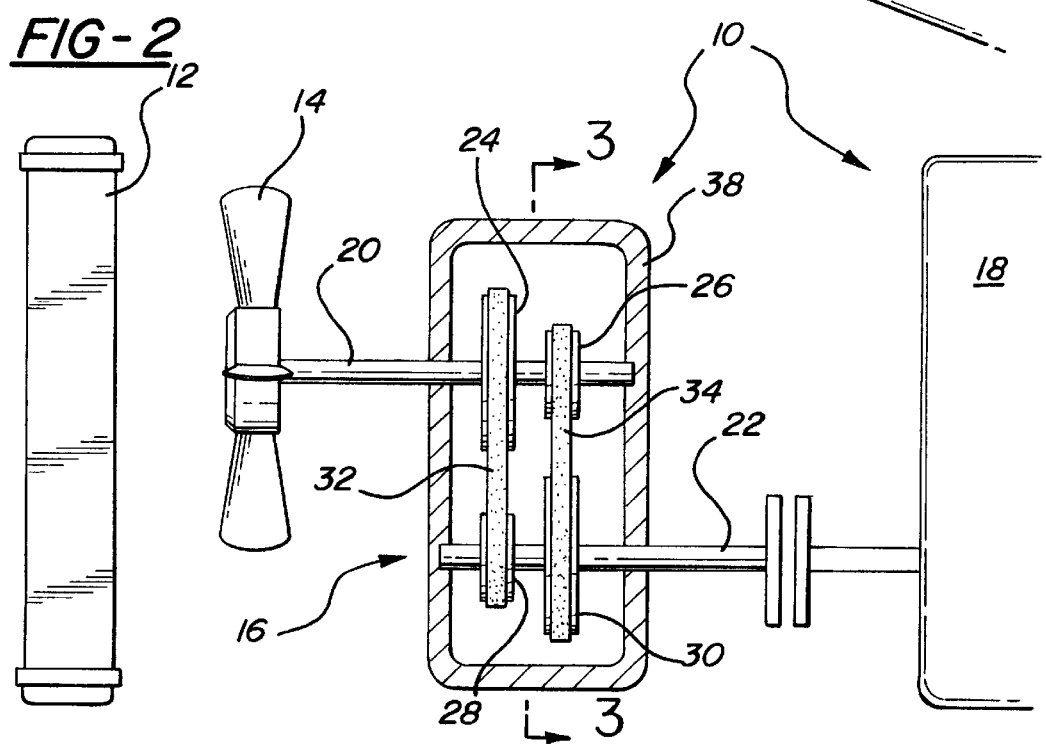

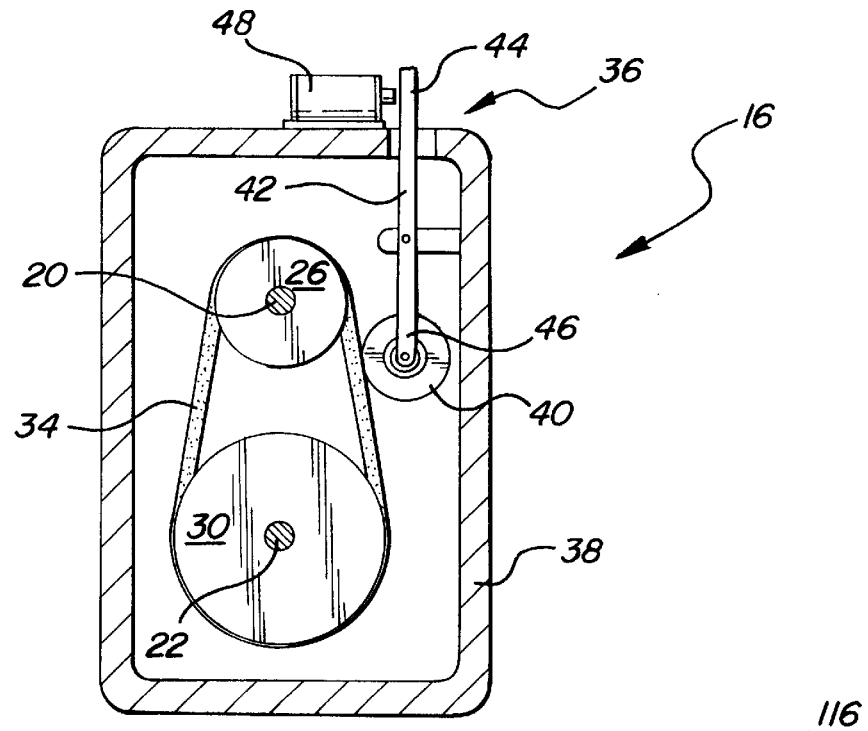

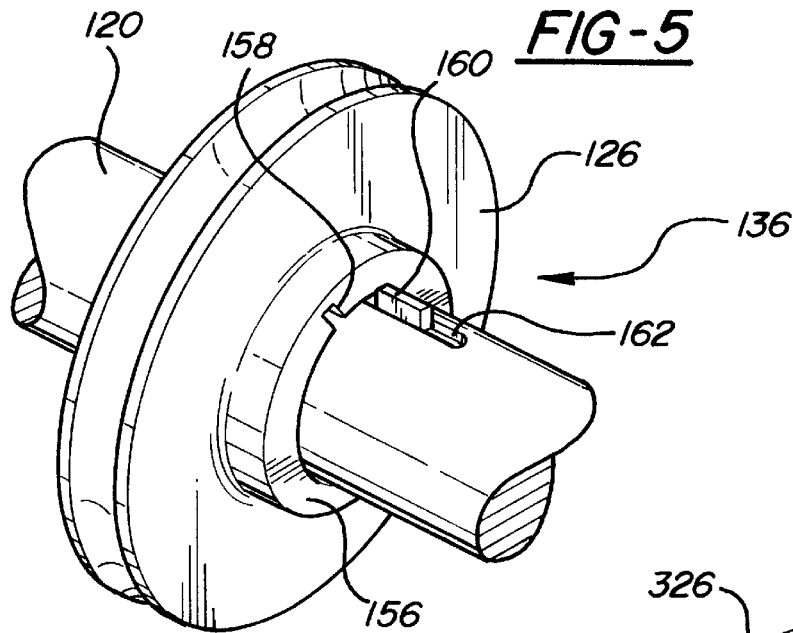
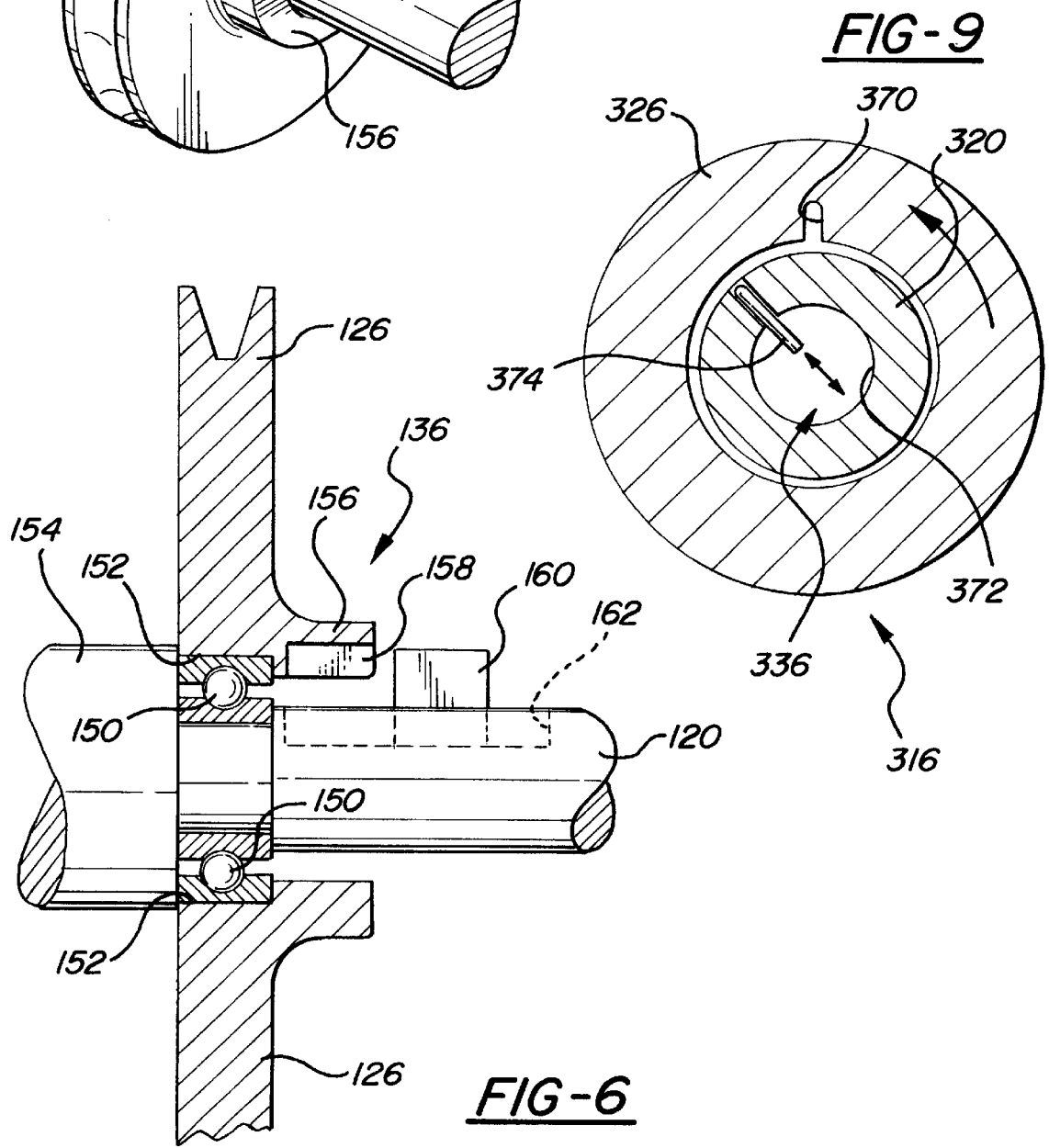

TECHNICAL FIELD

TECHNICAL FIELD

The subject invention relates to controlling the speed of a cooling fan in an automotive cooling assembly. More specifically, the subject invention selectively controls the rotation of a fan shaft in response to rotation of a drive shaft to control the rotational speed of the cooling fan.

BACKGROUND OF THE INVENTION

Automotive cooling assemblies typically include a heat exchanger and a cooling fan for passing ambient air over the heat exchanger. Heat exchangers are usually a type of radiator with a liquid passing therethrough. The liquid flows through the heat exchanger and is cooled by the ambient air.

Cooling fans connected directly to an automotive engine would continuously run at the same rotational speed as the engine. The cooling requirements of the engine may vary over time depending upon any number of factors, such as temperature of the engine, ambient temperature, speed of the vehicle, or load carried by the vehicle. Hence, it is frequently desirable to rotate the cooling fan at different rotational speeds irrespective of the rotational speed of the engine. Accordingly, cooling fans are typically not connected directly to the engine. Cooling fans are connected to a fan drive which interconnects the engine and the cooling fan. The fan drive will rotate the cooling fan at various speeds when needed. There are currently four types of fan drives which are well known in the automotive art, these include viscous fan drives, on-off clutches, hydraulic fan drives, and electric fan drives.

Viscous fan drives typically include a cylindrical housing defining a chamber therein. The cooling fan is mounted to the outside of the cylindrical housing. A rotatable drive shaft and disc extend from an engine and into the chamber. The chamber is partially filled with an oil or similar fluid. When the drive shaft begins to rotate, the disk creates a shearing force on the oil which transmits a torque to the cylindrical housing to rotate the cooling fan. The speed of the cooling fan is varied by changing the amount of oil inside the chamber. U.S. Pat. No. 4,278,159 to Roth et al. discloses this type of viscous fan drive as used in an automotive application. Viscous fan drives, however, have a number of deficiencies. The maximum rotational speed the cooling fan is limited to the rotational speed of the engine. Viscous fan drives rely on centrifugal forces to transfer the oil into the chamber and to create the necessary shearing forces. At low engine speeds there is little centrifugal force to create the necessary shear forces. Hence, the cooling fan may not rotate at a desired speed.

On-off clutches typically connect two surfaces to each other using pressurized air from a vehicle's compressor. Torque is transmitted mechanically by the surfaces contact and friction. The primary disadvantage to this type of system is that the cooling fan is rotating at either full speed, which is equal to the engine speed, or not rotating at all. There is no speed modulation. Further, these systems require a compressed air source which is usually only available on large trucks.

Hydraulic fan drives usually have a pump which drives a hydraulic motor connected to the cooling fan. A valve is used to control how much flow and/or pressure goes to the hydraulic motor which in turn controls the cooling fan rotational speed. These hydraulic fan drives are, however, very expensive to purchase and maintain which generally prohibits their use in most automobile applications.

Electric fan drives are very common and typically consist of an electric motor connected to the cooling fan. By varying the electric power to the motor the rotational speed of the cooling fan may be adjusted. The primary disadvantage to these types of fan drives is the amount of electricity needed to power the motor at high speeds. This amount of electricity can be particularly burdensome when a large motor, such as a truck motor, is idling at a low speeds.

SUMMARY OF THE INVENTION AND ADVANTAGES

An automotive cooling assembly comprising a heat exchanger and a cooling fan for forcing air over the heat exchanger. A fan shaft supports the cooling fan and a drive shaft is parallel to the fan shaft. First and second pulleys having first and second diameters are mounted on the fan shaft. Third and fourth pulleys having third and fourth diameters are mounted on the drive shaft. A first belt associated with the first and third pulleys couples the first pulley to the third pulley. A second belt associated with the second and fourth pulleys couples the second pulley to the fourth pulley. Engagement means allows the fan shaft to remain stationary while the drive shaft is rotating and selectively engages one of the first or second belts and their respective associated pulleys into driving relationship for rotating the fan shaft in response to rotation of the drive shaft.

Accordingly, the subject invention provides a cooling assembly having a cooling fan coupled to a drive shaft of an engine, wherein the rotational speed of the cooling fan can be faster, slower or in sync with the rotational speed of the engine. The cooling fan of the subject invention can also remain stationary while the drive shaft of the engine is still rotating. Hence, the cooling fan effectively forces air over a heat exchanger of the engine when necessary irrespective of the rotational speed of the engine. Further, the cooling fan of the subject invention is relatively inexpensive and does not burden the electrical components of the engine.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of an automotive cooling assembly incorporating the subject invention;

FIG. 2 is a partially cross-sectional side view of the automotive cooling assembly;

FIG. 3 is a partially cross-sectional view taken along line 3—3 of FIG. 2;

FIG. 4 is a fragmented partially cross-sectional side view of an alternative embodiment of the automotive cooling assembly;

FIG. 5 is an enlarged perspective view of a portion of the alternative embodiment of FIG. 4;

FIG. 6 is a partially cross-sectional view taken along line 6—6 of FIG. 4;

FIG. 9 is a partially cross-sectional view of yet another alternative embodiment of the automotive cooling assembly.

DETAILED DESCRIPTION OF THE PREFERRED EMBODIMENT

Figure 7:
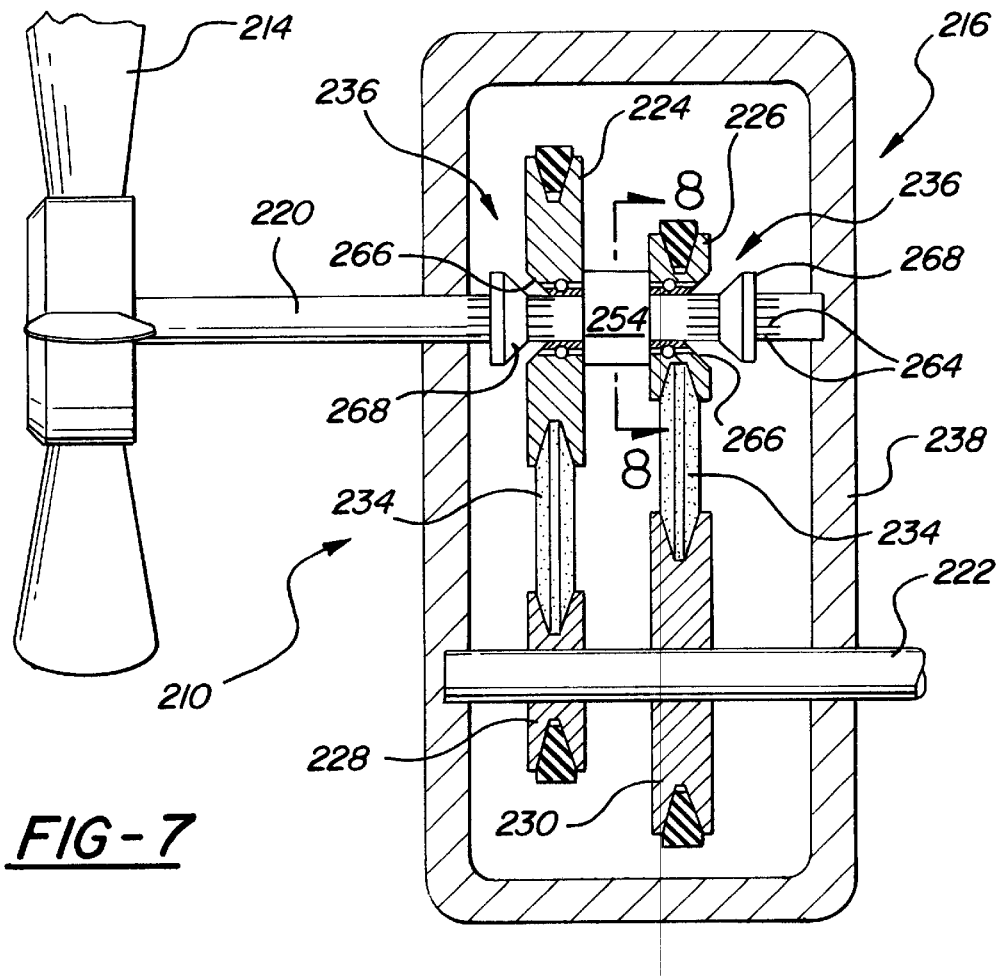
FIG. 7 is a fragmented partially cross-sectional side view of another alternative embodiment of the automotive cooling assembly.

Referring to the Figures, wherein like numerals indicate like or corresponding parts throughout the several views, an automotive cooling assembly in accordance with the primary embodiment of the subject invention is generally shown at 10 in FIGS. 1, 2, and 3. The automotive cooling assembly 10 comprises a heat exchanger 12 and a cooling fan 14 for forcing ambient air over the heat exchanger 12. The heat exchanger 12 is an automotive radiator 12 as are well known in the art. An automotive cooling fluid is cooled by the ambient air as the fluid passes through the radiator 12. The automotive cooling assembly 10 also includes a multiple speed fan drive, generally shown at 16, interconnecting an engine 18 of a vehicle (not shown) to the cooling fan 14.

The multiple speed fan drive 16 includes a fan shaft 20 to support the cooling fan 14. A drive shaft 22 extending from the engine 18 is also included. The drive shaft 22 is parallel to the fan shaft 20. First 24 and second 26 pulleys having first and second diameters are mounted on tie fan shaft 20. Third 28 and fourth 30 pulleys having third and fourth diameters are mounted on the drive shaft 22. The first 24 and third 28 pulleys are substantially in-line with each other to accommodate a first belt 32. The first belt 32 associated with the first 24 and third 28 pulleys couples the first pulley 24 to the third pulley 28. The second 26 and fourth 30 pulleys are substantially in-line with each other to accommodate a second belt 34. The second belt 34 associated with the second 26 and fourth 30 pulleys couples the second pulley 26 to the fourth pulley 30. As appreciated by those skilled in the art, the two sets of pulleys and belts are shown purely for illustrative purposes. Any number of pulleys and associated belts may be mounted to the respective shafts without deviating from the scope of the subject invention.

As best shown in FIG. 3, an engagement means, generally shown at 36, is provided for allowing the fan shaft 20 to remain stationary while the drive shaft 22 is rotating. The stationary condition of the fan shaft 20 equates to no rotation of the cooling fan 14 and is the first rotational speed of the cooling fan 14.

The engagement means 36 selectively engages one of the first 32 or second 34 belts and their respective associated pulleys 24, 26, 28, 30 into driving relationship for rotating the fan shaft 20 in response to rotation of the drive shaft 22. The diameters of the first 24 and third 28 pulleys provide a first driving ratio between the fan shaft 20 and the drive shaft 22. The first driving ratio equates to the second rotational speed of the cooling fan 14 The diameters of the second 26 and fourth 30 pulleys provide a second driving ratio between the fan shaft 20 and the drive shaft 22 wherein the second driving ratio is different than the first driving ratio. The second driving ratio equates to the third rotational speed of the cooling fan 14.

The first and second driving ratios contemplated in the embodiments of the subject invention include the first driving ratio as two to one and the second driving ratio as one to two. Accordingly, the first rotational speed of the cooling fan 14 is zero or stationary with respect to the rotational speed of the drive shaft 22. The second rotational speed of the cooling fan 14 utilizes the first driving ratio of two to one such that the rotational speed of the cooling fan 14 is faster than the rotational speed of the drive shaft 22. The third rotational speed of the cooling fan 14 utilizes the second driving ratio of one to two such that the rotational speed of the cooling fan 14 is slower than the rotational speed of the drive shaft 22. These specific ratios of the first and second driving ratios are accomplished by having the first diameter of the first pulley 24 substantially the same as the fourth diameter of the fourth pulley 30 and the second diameter of the second pulley 26 substantially the same as the third diameter of the third pulley 28. As appreciated by those skilled in the art, the driving ratios between the respective shafts may be any ratio without deviating from the scope of the subject invention. Further, there may be certain applications that require the cooling fan 14 to operate at more than three different speeds which would in turn require additional pulleys and belts to provide additional driving ratios.

A housing 38, shown in phantom in FIG. 1, surrounds the pulleys 24, 26, 28, 30, belts 32, 34, and shafts 20, 22 to protect the various components from the harsh environment within an engine compartment. As shown in each of the embodiments of the subject invention, the third 28 and fourth 30 pulleys are fixedly mounted to the drive shaft 22. More specifically, the third 28 and fourth 30 pulleys are press fit around the drive shaft 22.

As shown in the primary embodiment of FIGS. 1, 2, and 3, the first 24 and second 26 pulleys are also fixedly mounted to the fan shaft 20. Similarly, the first 24 and second 26 pulleys are press fit around the fan shaft 20. The first 24, second 26, third 28, and fourth 30 pulleys may be fixedly mounted to their respective shafts 20, 22 in any suitable manner without deviating from the scope of the subject invention. The first 32 and second 34 belts have flat outer surfaces and flat inner surfaces riding within their respective associated pulleys. These belts 32, 34, however, may be of any suitable design so long as a certain amount of slippage is created between the belts 32, 34 and their respective associated pulleys 24, 26, 28, 30. A certain amount of slippage of the belts 32, 34 around the first 24 and second 26 pulleys is desirable when the engagement means 36 are disengaged. This ensures that when the engagement means 36 are disengaged, the fan shaft 20 will remain stationary irrespective of the rotational speed of the drive shaft 22.

In the primary embodiment, the engagement means 36 comprises a tensioner 36 for allowing the fan shaft 20 to remain stationary while the drive shaft 22 is rotating. The tensioner 36 also allows for selective engagement of the flat outer surface of one of the first 32 or second 34 belts to tighten the first 32 or second 34 belt around their respective associated pulleys 24, 26, 28, 30 for rotating the fan shaft 20 in response to rotation of the drive shaft 22. Two tensioners 36 are contemplated, one for each of the first 32 and second 34 belts. Only one tensioner 36 is actuated at any one given time to ensure that only one belt 32, 34 is engaged at any given time. As appreciated by those skilled in the art, more tensioners may be required if additional belts and pulleys are to be utilized. For illustrative purposes only one tensioner 36 is shown in the Figures and described in detail hereinbelow.

The tensioner 36 comprises an idler pulley 40 and a pivotal arm 42 having first 44 and second 46 ends with the idler pulley 40 rotatably mounted to the second end 46 of the pivotal arm 42. The idler pulley 40 is very similar to a flat wheel wherein the outer surface of the idler pulley 40 easily engages the outer surface of the selected belt 32, 34. As appreciated by those skilled in the art the idler pulley 40 may be of any suitable design so long as there is adequate interface between the idler pulley 40 and the selected belt 32, 34.

A temperature controlled solenoid 48 actuates the first end 44 of the pivotal arm 42 to move the idler pulley 40 into engagement with one of the first 32 or second 34 belts. This tensioning of the belts 32, 34 engages the first 32 or second 34 belt with their respective associated pulleys 24, 26, 28, 30 to rotate the fan shaft 20 in response to rotation of the drive shaft 22. The solenoid 48 is simply shown as a typical actuator for the pivotal arm 42. Any number of actuators may used without deviating from the scope of the subject invention.

An alternative embodiment of the subject invention is shown in FIGS. 4, 5, and 6 wherein like numbers increased by one hundred indicate like or corresponding parts. A fragmented view of an automotive cooling assembly is generally shown at 110 in FIG. 4. The automotive cooling assembly 110 includes a heat exchanger (not shown) and a cooling fan 114 for forcing air over the heat exchanger. The automotive cooling assembly 110 also includes a multiple speed fan drive, generally shown at 116, interconnecting an engine (not shown) of a vehicle (not shown) to the cooling fan 114.

The multiple speed fan drive 116 includes a fan shaft 120 to support the cooling fan 114. A drive shaft 122 extends from the engine and runs parallel to the fan shaft 120. First 124 and second 126 pulleys having first and second diameters are mounted on the fan shaft 120. Third 128 and fourth 130 pulleys having third and fourth diameters are mounted on the drive shaft 122. The first 124 and third 128 pulleys are substantially in-line with each other to accommodate a first belt 132. The first belt 132 associated with the first 124 and third 128 pulleys couples the first pulley 124 to the third pulley 128. The second 126 and fourth 130 pulleys are substantially in-line with each other to accommodate a second belt 134. The second belt 134 associated with the second 126 and fourth 130 pulleys couples the second pulley 126 to the fourth pulley 130.

An engagement means, generally shown at 136, selectively engages one of the first 132 or second 134 belts and more specifically their respective associated pulleys 124, 126, 128, 130 into driving relationship for rotating the fan shaft 120 in response to rotation of the drive shaft 122. As discussed above in greater detail, the diameters of the first 124 and third 128 pulleys provide a first driving ratio and the diameters of the second 126 and fourth 130 pulleys provide a second driving ratio. The driving ratios and the corresponding rotational speeds of the cooling fan 114 in this alternative embodiment are substantially the same as in the primary embodiment. Also discussed above, the third 128 and fourth 130 pulleys are fixedly mounted to the drive shaft 122.

As best shown in FIG. 6, a plurality of bearings 150 are disposed within the first 124 and second 126 pulleys and overlay the fan shaft 120 to allow the first 124 and second 126 pulleys to freely rotate about the fan shaft 120. More specifically, the bearings 150 seat within a recess 152 in the fan shaft 120. The fan shaft 120 also has a thicker portion 154 disposed between the first 124 and second 126 pulleys. The thicker portion 154 assists in retaining the bearings 150 in their proper orientation. The first 132 and second 134 belts have flat outer surfaces and V-shaped inner surfaces riding within their respective associated pulleys 124, 126, 128, 130. These belts 132, 134, however, may be of any suitable design so long as the belts adequately grip the pulleys to avoid any unnecessary slippage. In this alternative embodiment, slippage between the belts 132, 134 and their respective associated pulleys 124, 126, 128, 130 is both undesirable and unnecessary. When the engagement means 136 are disengaged, the first 124 and second 126 pulleys freely rotate around the fan shaft 120 without transmitting any torque to the fan shaft 120. This ensures that when the engagement means 136 are disengaged, the fan shaft 120 will remain stationary irrespective of the rotational speed of the drive shaft 122.

The first 124 and second 126 pulleys also include outwardly extending flanges 156 with an integral slot 158 formed therein. The engagement means 136 comprises a sliding key 160 for allowing the fan shaft 120 to remain stationary while the drive shaft 122 is rotating. The sliding key 160 also allows for selective engagement into the integral slot 158 of one of the first 124 or second 126 pulleys for rotating the fan shaft 120 in response to rotation of the drive shaft 122. Two sliding keys 160 are contemplated, one for each of the first 132 and second 134 belts. Only one key 160 is actuated at any one given time to ensure that only one pulley 124, 126 is engaged at any given time.

The sliding key 160 is a rectangular shaped block 160 slidably mounted within a channel 162 in the fan shaft 120. An actuator (not shown) moves the key 160 within the channel 162 toward and away from the selected first 124 or second 126 pulley. During engagement of the selected pulley 124, 126 with the fan shaft 120, the integral slot 158 aligns with the channel 162 in the fan shaft 120 and the block 160 slides along the channel 162 into the integral slot 158. This engagement locks the selected pulley 124, 126 to the fan shaft 120 to rotate the fan shaft 120 and cooling fan 114 at the selected rotational speed.

Figure 8:
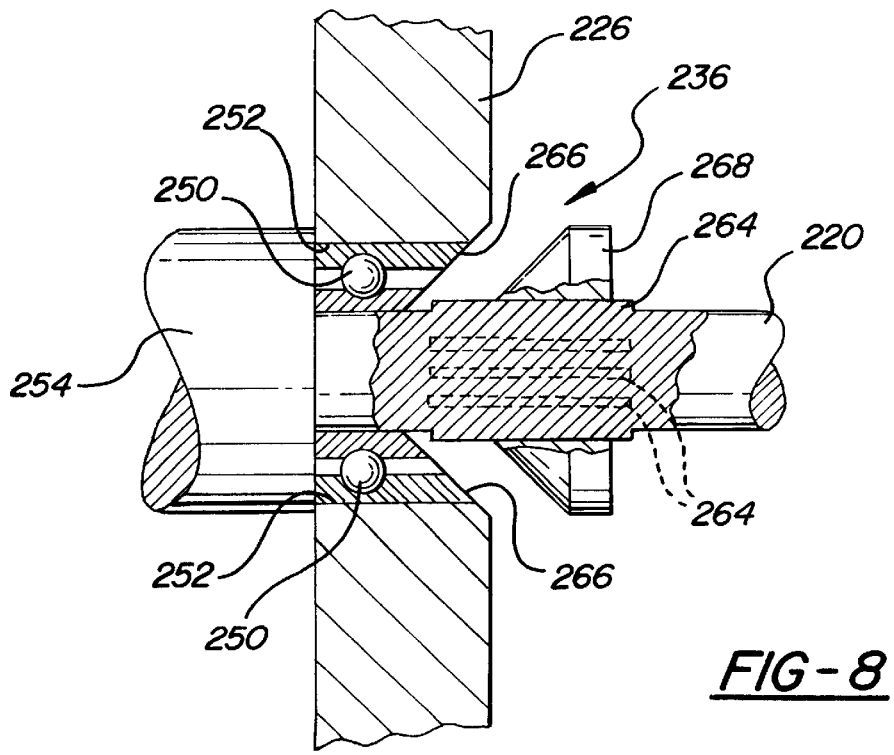
FIG. 8 is a partially cross-sectional view taken along line 8—8 of FIG. 7.

Another alternative embodiment of the subject invention is shown in FIGS. 7 and 8 wherein like numbers increased by two hundred indicate like or corresponding parts. A fragmented view of an automotive cooling assembly is generally shown at 210 in FIG. 7. The automotive cooling assembly 210 includes a heat exchanger (not shown) and a cooling fan 214 for forcing air over the heat exchanger. The automotive cooling assembly 210 also includes a multiple speed fan drive, generally shown at 216, interconnecting an engine (not shown) of a vehicle (not shown) to the cooling fan 214.

The multiple speed fan drive 216 includes a fan shaft 220 to support the cooling fan 214. A drive shaft 222 extends from the engine and runs parallel to the fan shaft 220. First 224 and second 226 pulleys having first and second diameters are mounted on the fan shaft 220. Third 228 and fourth 230 pulleys having third and fourth diameters are mounted on the drive shaft 222. The first 224 and third 228 pulleys are substantially in-line with each other to accommodate a first belt 232. The first belt 232 associated with the first 224 and third 228 pulleys couples the first pulley 224 to the third pulley 228. The second 226 and fourth 230 pulleys are substantially in-line with each other to accommodate a second belt 234. The second belt 234 associated with the second 226 and fourth 230 pulleys couples the second pulley 226 to the fourth pulley 230.

An engagement means, generally shown at 236, selectively engages one of the first 232 or second 234 belts and more specifically their respective associated pulleys 224, 226, 228, 230 into driving relationship for rotating the fan shaft 220 in response to rotation of the drive shaft 222. As discussed above in greater detail, the diameters of the first 224 and third 228 pulleys provide a first driving ratio and the diameters of the second 226 and fourth 230 pulleys provide a second driving ratio. The driving ratios and the corresponding rotational speeds of the cooling fan 214 in this alternative embodiment are substantially the same as in the primary embodiment. Also discussed above, the third 228 and fourth 230 pulleys are fixedly mounted to the drive shaft 222.

As best shown in FIG. 8, a plurality of bearings 250 are disposed within the first 224 and second 226 pulleys and overlay the fan shaft 220 to allow the first 224 and second 226 pulleys to freely rotate about the fan shaft 220. More specifically, the bearings 250 seat within a recess 252 in the fan shaft 220. The fan shaft 220 also has a thicker portion 254 disposed between the first 224 and second 226 pulleys. The thicker portion 254 assists in retaining the bearings 250 in their proper orientation. The first 232 and second 234 belts have flat outer surfaces and V-shaped inner surfaces riding within their respective associated pulleys 224, 226, 228, 230. These belts 232, 234, however, may be of any suitable design so long as the belts adequately grip the pulleys to avoid any unnecessary slippage. As discussed above, the first 224 and second 226 pulleys freely rotate around the fan shaft 220 when the engagement means 236 are disengaged. This ensures that the fan shaft 220 will remain stationary irrespective of the rotational speed of the drive shaft 222.

In this alternative embodiment, the fan shaft 220 includes a number of outwardly protruding splines 264 extending along a portion thereof. The first 224 and second 226 pulleys each include recessed frictional surfaces 266. The engagement means 236 comprises frusto-conical friction plates 268 mounted along the splines 264 of the fan shaft 220 for limited axial movement. The friction plates 268 allow the fan shaft 220 to remain stationary while the drive shaft 222 is rotating and selectively engage the recessed frictional surfaces 266 of one of the first 224 or second 226 pulleys to rotate the fan shaft 220 in response to rotation of the drive shaft 222. Two friction plates 268 are contemplated, one for each of the first 232 and second 234 belts. Only one friction plate 268 is actuated at any one given time to ensure that only one pulley 224, 226 is engaged at any given time.

The friction plate 268 has a number of internal grooves that align with the outwardly protruding splines 264 of the fan shaft 220. An actuator (not shown) moves the friction plate 268 along the fan shaft 220 toward and away from the selected first 224 or second 226 pulley. During engagement of the selected pulley 224, 226 with the fan shaft 220, the friction plate 268 slides along the fan shaft 220 until engagement with the recessed frictional surfaces 266 is achieved. This engagement frictionally locks the selected pulley 224, 226 to the fan shaft 220.

Yet another alternative embodiment of the subject invention is shown in FIG. 9 wherein like numbers increased by three hundred indicate like or corresponding parts. A multiple speed fan drive, generally shown at 316, includes a fan shaft 320 to support a cooling fan (not shown). First and second 326 pulleys having first and second diameters are mounted on the fan shaft 320. For illustrative purposes only a cross-sectional view of the fan shaft 320 and the second pulley 326 is shown in the Figure. A belt (not shown) associated with the second pulley 326 couples the second pulley 326 to a fourth pulley (not shown).

An engagement means, generally shown at 336, selectively engages one of the first or second 326 pulleys into driving relationship for rotating the fan shaft 320 in response to rotation of a drive shaft (not shown).

In this alternative embodiment, the first and second 326 pulleys each include an internal slot 370. Again for illustrative purposes only the second pulley 326 is shown. The fan shaft 320 comprises a hollow inner bore 372 with the engagement means 336 mounted therein. The engagement means 336 extends outwardly from the fan shaft 320 to selectively engage the internal slot 370 within the first or second 326 pulleys for rotating the fan shaft 320 in response to rotation of the drive shaft. More specifically, the engagement means 336 comprises a deployable key 374 mounted for relative axial movement inside the fan shaft 320. Two deployable keys 374 are contemplated, one for each of the first and second belts. Only one deployable key 374 is actuated at any one given time to ensure that only one of the selected first or second 326 pulleys is engaged at any given time. For illustrative purposes only one deployable key 374 and only the second pulley 326 is shown in the Figures and described in detail hereinbelow.

An actuator (not shown) moves the deployable key 374 within the fan shaft 320 toward and away from the pulley 326. During engagement of the pulley 326 with the fan shaft 320, the internal slot 370 within the pulley 326 aligns with the deployable key 374 within the fan shaft 320 wherein the deployable key 374 is extended outwardly into the internal slot 370. This engagement locks the selected pulley to the fan shaft 320.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be limiting in any way, the invention may be practiced otherwise than as specifically described.

What is claimed is:

1. An automotive cooling assembly comprising:

a heat exchanger, a cooling fan for forcing air over said heat exchanger, a fan shaft supporting said cooling fan, a drive shaft parallel to said fan shaft, first and second pulleys having first and second diameters mounted on said fan shaft, third and fourth pulleys having third and fourth diameters mounted on said drive shaft, a first belt associated with said first and third pulleys to couple said first pulley to said third pulley, a second belt associated with said second and fourth pulleys to couple said second pulley to said fourth pulley, engagement means for selectively coupling one of said first or second belts and their respective associated pulleys into a driving condition for rotating said fan shaft in response to rotation of said drive shaft, and for selectively de-coupling both of said first and second belts and their respective associated pulleys for allowing said fan shaft to remain stationary while said drive shaft is rotating.

2. An assembly as set forth in claim 1 wherein said diameters of said first and third pulleys provide a first driving ratio between said fan shaft and said drive shaft and said diameters of said second and fourth pulleys provide a second driving ratio between said fan shaft and said drive shaft different than said first driving ratio.

3. An assembly as set forth in claim 2 wherein said first driving ratio of said first and third pulleys is two to one and said second driving ratio of said second and fourth pulleys is one to two.

4. An apparatus as set forth in claim 3 wherein said first diameter of said first pulley is substantially the same as said fourth diameter of said fourth pulley and said second diameter of said second pulley is substantially the same as said third diameter of said third pulley.

5. An assembly as set forth in claim 2 including a housing for surrounding said pulleys, said belts, and said shafts.

6. An assembly as set forth in claim 2 wherein said third and fourth pulleys are fixedly mounted to said drive shaft.

7. An assembly as set forth in claim 6 including a plurality of bearings disposed within said first and second pulleys and overlaying said fan shaft to allow said first and second pulleys to freely rotate about said fan shaft.

8. An assembly as set forth in claim 7 wherein said first and second belts have flat outer surfaces and V-shaped inner surfaces riding within their respective associated pulleys.

9. An assembly as set forth in claim 7 wherein said first and second pulleys include outwardly extending flanges with an integral slot formed therein.

10. An assembly as set forth in claim 9 wherein said engagement means comprises a sliding key for selective movement into said integral slot of one of said first or second pulleys for rotating said fan shaft in response to rotation of said drive shaft.

11. An assembly as set forth in claim 7 wherein said fan shaft includes a number of outwardly protruding splines extending along a portion thereof.

12. An assembly as set forth in claim 11 wherein said first and second pulleys each include recessed frictional surfaces.

13. An assembly as set forth in claim 12 wherein said engagement means comprises frusto-conical friction plates mounted along said splines of said fan shaft for limited axial movement, said friction plates allow said fan shaft to remain stationary while said drive shaft is rotating and engage said recessed friction surfaces of one of said first or second pulleys to rotate said fan shaft in response to rotation of said drive shaft.

14. An assembly as set forth in claim 7 wherein said first and second pulleys each include an internal slot.

15. An assembly as set forth in claim 14 wherein said fan shaft comprises a hollow inner bore.

16. An assembly as set forth in claim 15 wherein said engagement means comprises a deployable key mounted within said hollow inner bore of said fan shaft, said deployable key extends outwardly from said fan shaft to selectively engage said internal slots within said first or second pulleys for rotating said fan shaft in response to rotation of said drive shaft.

* * * * *

UNITED STATES PATENT AND TRADEMARK OFFICE
CERTIFICATE OF CORRECTION

PATENT NO. : 5,871,412
DATED : February 16, 1999
INVENTOR(S) : George Moser

It is certified that error appears in the above-identified patent and that said Letters Patent is hereby corrected as shown below:

On the title page, Item [54]Title, should read --TECHNICAL FEILD--.

Signed and Sealed this

Sixth Day of July, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,871,412
DATED      : February 16, 1999
INVENTOR(S) : George Moser It is certified that error appears in the above-identified patent and that said Letters Patent is hereby corrected as shown below:

On the title page, Item [54]Title, should read --MULTIPLE SPEED FAN DRIVE--

This Certificate supersedes Certificate of Correction issued July 6, 1999.

Signed and Sealed this

Fourteenth Day of September, 1999

Attest:

Q. TODD DICKINSON

*Attesting Officer*     *Acting Commissioner of Patents and Trademarks*